Jan. 7, 1941.  W. A. KOSTER  2,227,589

AUXILIARY TRANSMISSION

Filed Jan. 30, 1939

INVENTOR.
William A. Koster,
BY Hoguet, Neary & Campbell,
ATTORNEYS

Patented Jan. 7, 1941

2,227,589

UNITED STATES PATENT OFFICE 2,227,589

AUXILIARY TRANSMISSION

William A. Koster, Highland Park, N. J., assignor to Mack Manufacturing Corporation, Long Island City, N. Y., a corporation of Delaware Application January 30, 1939, Serial No. 253,546

5 Claims. (Cl. 74—606)

The present invention relates to transmissions and embodies, more particularly, an improved form of transmission which is particularly adaptable for use on motor vehicles wherein the number of speed changes available in service is considerably increased over those available in the standard transmissions commonly available.

The invention has to do, particularly, with features of transmission design for transmissions having main, as well as auxiliary speed change mechanisms in order that the speed changes of the main transmission mechanism may be augmented or multiplied by the auxiliary transmission. This general type of transmission is now in fairly general use in certain specialized fields where heavy duty service calls for multiple transmission speeds in order that the engine may be utilized more efficiently. Such multiple speed transmission, that is, transmissions with more than five forward speeds, when provided with properly spaced rations, will permit the truck operator to use the available engine horse power to fuller advantage when climbing grades than is now possible with transmissions having a relatively few number of speed changes.

As aforesaid, multiple speed transmissions are now available in structures utilizing an auxiliary transmission in tandem with the main transmission to provide the number of increased speed changes. In these available structures, however, the design results in unnecessarily heavy, large and cumbersome units which are difficult to assemble and service.

In accordance with the present invention, it is proposed to provide a transmission mechanism of the above character which is shorter in length and more compact than in existing structures.

A further object of the invention is to provide a transmission of the above character which is sturdy and the bearings of which have large capacity.

A further object of the invention is to provide a transmission mechanism of the above character in which the bearings may be adjusted effectively from outside the mechanism when the mechanism is in assembled condition.

A further object of the invention is to provide a device of the above character wherein the structure provides an auxiliary housing which is simple to build and assemble and which permits of ready inspection and maintenance of the device.

Further objects of the invention will be apparent as it is described in connection with the following drawing, wherein.

Figure 1:
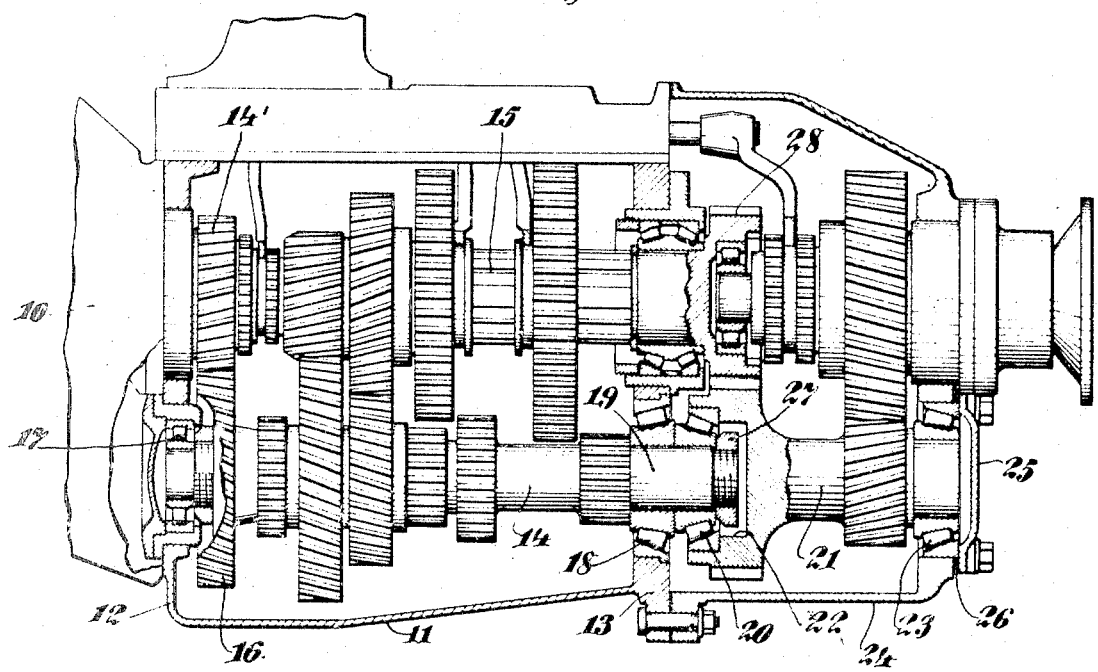
Fig. 1 is a view in section taken through a transmission mechanism constructed in accordance with the present invention and showing the essential operating parts thereof.
Figure 2:
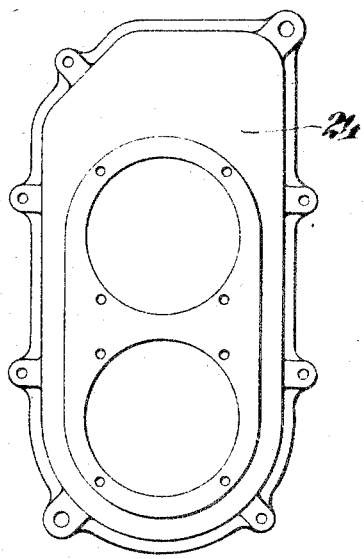
Fig. 2 is an end view of the auxiliary transmission housing.

With reference to the above drawing, the reference character 10 designates a clutch bell housing in connection with which the present mechanism may be used and from which a source of power may be derived. The transmission mechanism includes a main housing 11 having a front wall 12 and a rear wall 13. Within this housing is included a countershaft 14 which receives power from a driving gear 14'. At the forward end of the countershaft 14, there is provided, as is usual in these transmissions, a helical main drive gear 16 and forward of this gear is provided a cylindrical roller bearing 17 which is mounted in the front wall 12 of the main housing 11. It will be observed that this bearing 17 permits the countershaft 14 to float axially. The rear end of the countershaft 14 is mounted on a tapered roller bearing 18 which is located in the rear wall 13 of the main transmission housing.

The rear end of the countershaft 14 is formed with an extension 19 to accommodate a tapered roller bearing 20. This tapered roller bearing serves as a support for the forward end of an auxiliary countershaft 21 which is formed with a recessed portion 22 to receive the adjacent end of the extension 19. The other end of the auxiliary countershaft 21 is journaled in a tapered bearing 23 which is carried by the end wall of an auxiliary transmission housing 24. A cap or cover 25 is provided to secure the bearing 23 in position and, because of its being bolted to the end of the auxiliary transmission housing 24, the cover 25 serves as a means for locating the countershaft assembly in the position illustrated. Suitable shims 26 are provided to adjust the countershafts and tapered bearings properly when the cap 25 is secured in the position illustrated, and it will be observed that the tapered bearings 18, 20 and 23 are of such character that, by selecting the proper shims 26 the countershaft assembly can be accurately and quickly mounted in the transmission mechanism in proper relationship and with proper bearing adjustment. The tapered bearings 18 locate the countershaft 14 positively against axial motion to the left as viewed in Fig. 1. Likewise, tapered bearings 20 prevent relative movement between the main and auxiliary countershafts 14 and 21, respectively, in a direction toward each other and the tapered bearing 23 serves to transmit the thrust of the countershaft assembly to the auxiliary housing 24 through the cap or cover 25. The single tapered bearing 18 thus mounts the assembly in the rear wall 13 of the main transmission housing and the bearing adjustment is permitted by the cylindrical bearing 17 at the forward end of the countershaft 14. A nut 27 is provided for securing the inner races of the bearings 18 and 20 to the extension 19 of the countershaft 14.

It will be observed that the radial loads and the thrust created by the helical gears in the main and auxiliary transmissions are carried by all three of the tapered roller bearings 18, 20 and 23. For example, the countershaft thrust created by the main drive gear 16 is transmitted by the bearing 20 to the rear bearing 23 and the three tapered roller bearings complement each other to form a unit which is adjustable from the outside of the transmission case by means of the cap 25 and the shims 26. Moreover, by mounting the auxiliary countershaft on the main countershaft, the device is shorter and more compact and the usual inner wall which has been required in previous auxiliary transmission casings for supporting the auxiliary transmission bearing is thus avoided. The main drive gears of the auxiliary transmission are thus brought much closer to the rear wall of the main transmission and objectionable overhang is avoided.

A further advantage of the foregoing structure lies in the fact that the auxiliary transmission case is manufactured much more simply since it can be manufactured by a casting operation to form an open end green sand casting requiring no cores. In disassembling the transmission, the auxiliary mechanism can be removed from the main transmission without disturbing any of the gears, a feature which is of considerable advantage over existing forms of transmissions. In this connection, it should be noted that the spline shaft 15 is integral with the driving pinion 28 of the auxiliary transmission.

It will be readily apparent that the bearings 17 and 18 may, if desired, be interchanged so that the thrust will be carried by the end wall 12 of the transmission housing 11.

Further advantages and improvements will be readily apparent to those familiar with the construction and operation of a structure of this character, and the invention is not to be limited save as defined in the appended claims.

I claim:

1. In a transmission mechanism utilizing helical gears which exert axial thrust, the combination of a main countershaft, means for supporting one end of the main countershaft to permit floating axial movement of the shaft, a first tapered thrust bearing supporting the other end of said main countershaft, an auxiliary countershaft, a second tapered thrust bearing on said main countershaft and supporting one end of said auxiliary countershaft, the tapers of said first and second bearings being disposed in different directions, a third tapered thrust bearing supporting the other end of said auxiliary shaft, and the taper of said third bearing being disposed in substantially the same direction as the taper of said second bearing.

2. In a transmission mechanism utilizing helical gears which exert axial thrust, the combination of a main countershaft, means for supporting the main countershaft including a first tapered thrust bearing, an auxiliary countershaft, a second tapered thrust bearing on said main countershaft and supporting one end of said auxiliary countershaft, the tapers of said first and second bearings being disposed in different directions, a third tapered thrust bearing supporting the other end of said auxiliary shaft, and the taper of said third bearing being disposed in substantially the same direction as the taper of said second bearing.

3. In a transmission mechanism utilizing helical gears which exert axial thrust, the combination of a main countershaft, means for supporting one end of the main countershaft to permit floating axial movement of the shaft, a first tapered thrust bearing supporting the other end of said main countershaft, an auxiliary countershaft, a second tapered thrust bearing on said main countershaft and supporting one end of said auxiliary countershaft, the tapers of said first and second bearings being disposed in different directions, a third tapered thrust bearing supporting the other end of said auxiliary shaft, the taper of said third bearing being disposed in substantially the same direction as the taper of said second bearing, and means for adjustably supporting said third bearing for movement axially with respect to said first bearing.

4. In a transmission mechanism utilizing helical gears which exert axial thrust, the combination of means forming a housing, a main countershaft, means mounted in said housing for supporting one end of the main countershaft to permit floating axial movement thereof, a first tapered thrust bearing mounted in said housing and supporting the other end of said main countershaft, an auxiliary countershaft, a second tapered thrust bearing on said main countershaft and supporting one end of said auxiliary countershaft, the tapers of said first and second bearings being disposed in different directions, a third tapered thrust bearing mounted in said housing and supporting the other end of said auxiliary countershaft, the taper of said third bearing being disposed in substantially the same direction as the taper of said second bearing, and means associated with said housing for adjusting the axial position of said third bearing relative to said first bearing.

5. In a transmission mechanism utilizing helical gears which exert axial thrust, the combination of means forming a housing having an open end, a main countershaft, means mounted in said housing for supporting one end of the main countershaft to permit floating axial movement thereof, a first tapered thrust bearing mounted in said housing and supporting the other end of said main countershaft, an auxiliary countershaft, a second tapered thrust bearing on said main countershaft and supporting one end of said auxiliary countershaft, the tapers of said first and second bearings being disposed in different directions, a third tapered thrust bearing mounted in said housing adjacent the open end thereof to support the other end of said auxiliary countershaft, the taper of said third bearing being disposed in substantially the same direction as the taper of said second bearing, a cover for the open end of said housing to enclose said third bearing within said housing, and means associated with said cover for adjusting the axial position of said third bearing relative to said first bearing.

WILLIAM A. KOSTER.